J. D. LEWIS.
AXLE FOR FORD CARS.
APPLICATION FILED APR. 18, 1919.
1,380,985.
Patented June 7, 1921.
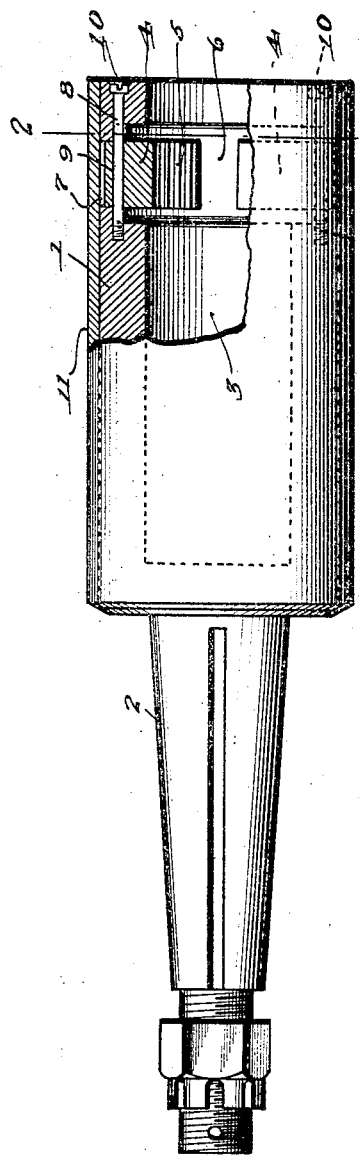
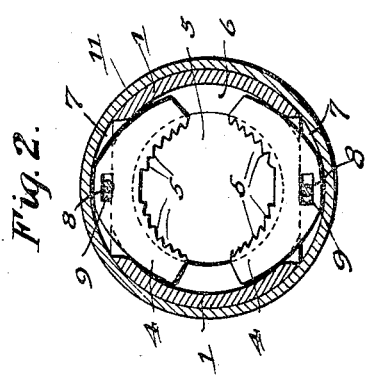
Witnesses
R. A. Thomas
Inventor
J. D. Lewis
By Victor J. Evans
Attorney

UNITED STATES PATENT OFFICE.

JOHN D. LEWIS, OF TYRONE, OKLAHOMA.

AXLE FOR FORD CARS.

1,380,985.  Specification of Letters Patent.  Patented June 7, 1921.

Application filed April 18, 1919. Serial No. 291,047.

*To all whom it may concern:*

Be it known that I, JOHN D. LEWIS, a citizen of the United States, residing at Tyrone, in the county of Texas and State of Oklahoma, having invented new and useful Improvements in Axles for Ford Cars, of which the following is a specification.

This invention relates to emergency spindles for automobiles and the principal object of the invention is to provide means whereby a broken spindle may be replaced so that the car may be driven to a repair shop.

Another object of the invention is to provide means whereby the emergency spindle will be locked to the end of the broken axle so that it will rotate therewith.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation, partly in section of the invention;

Fig. 2 is a cross section on line 2—2 of Fig. 1;

Fig. 3 is a perspective view of one of the dogs.

In these views 1 indicates a cylindrical member and 2 the spindle which is connected with the closed end of said member. This spindle is to receive the hub of the wheel in the ordinary manner. The bore 3 of the cylindrical member is adapted to receive the end of the broken axle and said member is locked to the axle so that it will rotate therewith by means of a pair of dogs 4. These dogs are of crescent shape and are provided with the teeth 5 on their concave faces. As shown, the teeth on one side of the dog are oppositely arranged to those on the other side so that one set of teeth will grip the axle when the same is rotated in one direction and the other set will grip the axle when the same is rotated in the opposite direction. These dogs are located in an annular groove 6 formed in the cylindrical member adjacent its open end. The cylindrical member is also provided with a pair of oppositely arranged openings 7 which communicate with said groove and the central parts of the dogs lie in said openings. The openings are made of sufficient size to permit play of the dogs therein so that said dogs may adjust themselves in the groove and to bring their thick central portions against the bottom of the groove to throw the dogs toward each other and thus grip the axle. This arrangement of parts sets up a cam action so that the dogs will automatically grip the axle. The dogs are held in place by the screws 8 passing through holes in the end of the cylindrical member and engaging slots 9 formed in the dogs. The cylindrical member is provided with a pair of oppositely arranged recesses 10 in its outer wall which communicate with the openings. The cylindrical member is inclosed in a brass sleeve 11 which acts as a bearing for said member when the same is in position.

When a spindle breaks it is simply necessary to remove the roller bearing at the end of the axle housing and place my emergency device in its place. As soon as the car is started the dogs will grip the axle so that the car may proceed under its power to a point where permanent repair may be made. My device will permit the car to be either backed or driven forwardly.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a cylindrical body provided with a bore and having an annular groove adjacent its open end, and a pair of openings communicating with said groove, a spindle connected with said body, a pair of dogs of crescent shape located in said openings with their ends engaging the groove, said dogs having oppositely arranged teeth on their inner faces and means for movably holding said dogs in place.

In testimony whereof I affix my signature.

JOHN D. LEWIS.